US007663543B2

(12) United States Patent
Norin et al.

(10) Patent No.: US 7,663,543 B2
(45) Date of Patent: Feb. 16, 2010

(54) ALIGNMENT METHOD FOR MULTI-SATELLITE CONSUMER RECEIVER ANTENNAS

(75) Inventors: John Norin, Redondo Beach, CA (US); Kesse Ho, Westminster, CA (US); Mike A. Frye, San Pedro, CA (US); Gustave Stroes, Beverly Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 659 days.

(21) Appl. No.: 11/545,846

(22) Filed: Oct. 11, 2006

(65) Prior Publication Data

US 2007/0080861 A1    Apr. 12, 2007

Related U.S. Application Data

(60) Provisional application No. 60/725,781, filed on Oct. 12, 2005, provisional application No. 60/725,782, filed on Oct. 12, 2005, provisional application No. 60/726,118, filed on Oct. 12, 2005, provisional application No. 60/726,149, filed on Oct. 12, 2005, provisional application No. 60/726,150, filed on Oct. 12, 2005, provisional application No. 60/726,151, filed on Oct. 12, 2005, provisional application No. 60/726,337, filed on Oct. 12, 2005, provisional application No. 60/727,143, filed on Oct. 14, 2005, provisional application No. 60/754,737, filed on Dec. 28, 2005, provisional application No. 60/758,762, filed on Jan. 13, 2006, provisional application No. 60/726,338, filed on Oct. 12, 2005.

(51) Int. Cl.
*H01Q 3/00* (2006.01)
*H04B 7/14* (2006.01)
*H04N 7/20* (2006.01)

(52) U.S. Cl. .................... 342/359; 343/757; 725/72
(58) Field of Classification Search ................. 342/359; 343/757; 725/72
See application file for complete search history.

(56) References Cited

U.S. PATENT DOCUMENTS

| 4,656,486 A |   | 4/1987 | Turner |
|---|---|---|---|
| 4,860,021 A |   | 8/1989 | Kurosawa et al. |
| 5,313,215 A | * | 5/1994 | Walker et al. ............... 342/352 |
| 5,617,107 A |   | 4/1997 | Fleming |
| 5,734,356 A |   | 3/1998 | Chang |

(Continued)

FOREIGN PATENT DOCUMENTS

WO    WO 2004/054128    6/2004

OTHER PUBLICATIONS

Notice of Allowance dated Aug. 6, 2009 in U.S. Appl. No. 11/545,845 filed Oct. 11, 2006 by John L. Norin.

(Continued)

*Primary Examiner*—Thomas H Tarcza
*Assistant Examiner*—Fred H Mull

(57) ABSTRACT

A method, apparatus and system for aligning an antenna reflector with satellites in a satellite configuration. A method in accordance with the present invention comprises aligning the reflector in azimuth and elevation with a first signal transmitted by a first satellite in the satellite configuration, and aligning the reflector in tilt with a second signal transmitted by a second satellite in the satellite configuration, wherein aligning the reflector in azimuth and elevation with the first signal and in tilt with the second signal aligns the reflector with at least a third signal transmitted from a third satellite.

20 Claims, 4 Drawing Sheets

U.S. PATENT DOCUMENTS

| | | | |
|---|---|---|---|
| 5,787,335 | A | 7/1998 | Novak |
| 5,898,680 | A | 4/1999 | Johnstone et al. |
| 5,959,592 | A | 9/1999 | Petruzzelli |
| 5,982,333 | A | 11/1999 | Stillinger et al. |
| 6,011,597 | A | 1/2000 | Kubo |
| 6,188,372 | B1 | 2/2001 | Jackson et al. |
| 6,340,956 | B1 | 1/2002 | Bowen et al. |
| 6,424,817 | B1 | 7/2002 | Hadden |
| 6,441,797 | B1 | 8/2002 | Shah |
| 6,486,907 | B1 | 11/2002 | Farber |
| 6,600,730 | B1 | 7/2003 | Davis et al. |
| 6,622,307 | B1 | 9/2003 | Ho |
| 6,653,981 | B2 | 11/2003 | Wang et al. |
| 6,693,587 | B1 * | 2/2004 | Kuether et al. ............... 342/359 |
| 6,710,749 | B2 | 3/2004 | King |
| 6,728,513 | B1 | 4/2004 | Nishina |
| 6,762,727 | B2 | 7/2004 | Rochford et al. |
| 6,864,855 | B1 | 3/2005 | Fujita |
| 6,879,301 | B2 | 4/2005 | Kozlovski |
| 6,906,673 | B1 | 6/2005 | Matz et al. |
| 6,965,343 | B1 | 11/2005 | Dybdal et al. |
| 7,095,378 | B1 | 8/2006 | Paquette |
| 7,162,200 | B2 | 1/2007 | Tsay et al. |
| 7,239,285 | B2 | 7/2007 | Cook |
| 2002/0003495 | A1 | 1/2002 | Johnstone et al. |
| 2002/0084941 | A1 | 7/2002 | Matz et al. |
| 2003/0023978 | A1 | 1/2003 | Bajgrowitz |
| 2003/0122723 | A1 | 7/2003 | Luly et al. |
| 2003/0129960 | A1 | 7/2003 | Kato |
| 2004/0060065 | A1 | 3/2004 | James et al. |
| 2004/0160375 | A1 | 8/2004 | King |
| 2004/0169114 | A1 | 9/2004 | Dierkes |
| 2004/0192190 | A1 | 9/2004 | Motoyama |
| 2005/0052335 | A1 | 3/2005 | Chen |
| 2005/0057428 | A1 | 3/2005 | Fujita |
| 2005/0184923 | A1 | 8/2005 | Saito et al. |
| 2006/0077097 | A1 | 4/2006 | Dybdal et al. |

OTHER PUBLICATIONS

Final Rejection dated Apr. 21, 2009 in U.S. Appl. No. 11/545,845 filed Oct. 11, 2006 by John Norin.

Non-final Office Action dated Oct. 17, 2008 in U.S. Appl. No. 11/545,845 filed Oct. 11, 2006 by John L. Norin.

* cited by examiner

ALIGNMENT METHOD FOR MULTI-SATELLITE CONSUMER RECEIVER ANTENNAS

CROSS-REFERENCE TO RELATED APPLICATIONS

This application Claims the benefit under 35 U.S.C. § 119(e) of the following and commonly-assigned U.S. provisional patent applications:

Application Ser. No. 60/725,781, filed on Oct. 12, 2005 by John L. Norin and Kesse Ho, entitled "TRIPLE STACK COMBINING APPROACH TO Ka/Ku SIGNAL DISTRIBUTION;"

Application Ser. No. 60/725,782, filed on Oct. 12, 2005 by Kesse Ho and John L. Norin, entitled "SINGLE LOCAL OSCILLATOR SHARING IN MULTI-BAND KA-BAND LNBS;"

Application Ser. No. 60/726,118, filed on Oct. 12, 2005 by John L. Norin, entitled "KA/KU ANTENNA ALIGNMENT;"

Application Ser. No. 60/726,149, filed on Oct. 12, 2005 by Kesse Ho, entitled "DYNAMIC CURRENT SHARING IN KA/KU LNB DESIGN;"

Application Ser. No. 60/726,150, filed on Oct. 12, 2005 by Kesse Ho, entitled "KA LNB UMBRELLA SHADE;"

Application Ser. No. 60/726,151, filed on Oct. 12, 2005 by John L. Norin and Kesse Ho, entitled "BAND UPCONVERTER APPROACH TO KA/KU SIGNAL DISTRIBUTION;"

Application Ser. No. 60/726,337, filed Oct. 12,2005, entitled "ENHANCED BACK ASSEMBLY FOR KA/KU ODU," by Michael A. Frye et al.;

Application Ser. No. 60/727,143, filed on Oct. 14, 2005 by John L. Norin and Kesse Ho, entitled "BAND UPCONVERTER APPROACH TO KA/KU SIGNAL DISTRIBUTION;"

Application Ser. No. 60/754,737, filed on Dec. 28, 2005 by John L. Norin, entitled "KA/KU ANTENNA ALIGNMENT;"

Application Ser. No. 60/758,762, filed on Jan. 13, 2006 by Kesse Ho, entitled "KA LNB UMBRELLA SHADE;" and Application Ser. No. 60/726,338, filed on Oct. 12, 2005 by John L. Norin, Kesse Ho, Mike A. Frye, and Gustave Stroes, entitled "NOVEL ALIGNMENT METHOD FOR MULTI-SATELLITE CONSUMER RECEIVE ANTENNAS," all of which applications are incorporated by reference herein.

BACKGROUND OF THE INVENTION

1. Field of the Invention

The present invention relates generally to a satellite receiver system, and in particular, to an alignment method for multi-satellite consumer receiver antennas.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Typically, an antenna is pointed toward the southern sky, and roughly aligned with the satellite downlink beam, and then fine-tuned using a power meter or other alignment tools. The precision of such an alignment is usually not critical. However, additional satellites are being deployed that require more exacting alignment methods, and, without exacting alignment of the antenna dish, the signals from the additional satellites will not be properly received, rendering these signals useless for data and video transmission. It can be seen, then, that there is a need in the art for an alignment method for a satellite broadcast system that can be expanded to include new satellites and new transmission frequencies.

SUMMARY OF THE INVENTION

To minimize the limitations in the prior art, and to minimize other limitations that will become apparent upon reading and understanding the present specification, the present invention discloses a method for aligning a multi-satellite receiver antenna, and more specifically, a method, apparatus and system for aligning an antenna reflector with satellites in a satellite configuration. A method in accordance with the present invention comprises aligning the reflector in azimuth and elevation with a first signal transmitted by a first satellite in the satellite configuration, and aligning the reflector in tilt with a second signal transmitted by a second satellite in the satellite configuration, wherein aligning the reflector in azimuth and elevation with the first signal and in tilt with the second signal aligns the reflector with at least a third signal transmitted from a third satellite.

Such a method optionally further comprises the first satellite being at a first orbital slot and the second satellite is at a second orbital slot, the third satellite being at a third orbital slot, the first satellite and the second satellite transmitting in a first frequency band, the third satellite transmitting in a second frequency band, and re-aligning the reflector in azimuth and elevation with the first signal transmitted by the first satellite after aligning the reflector in tilt.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Figure 1:
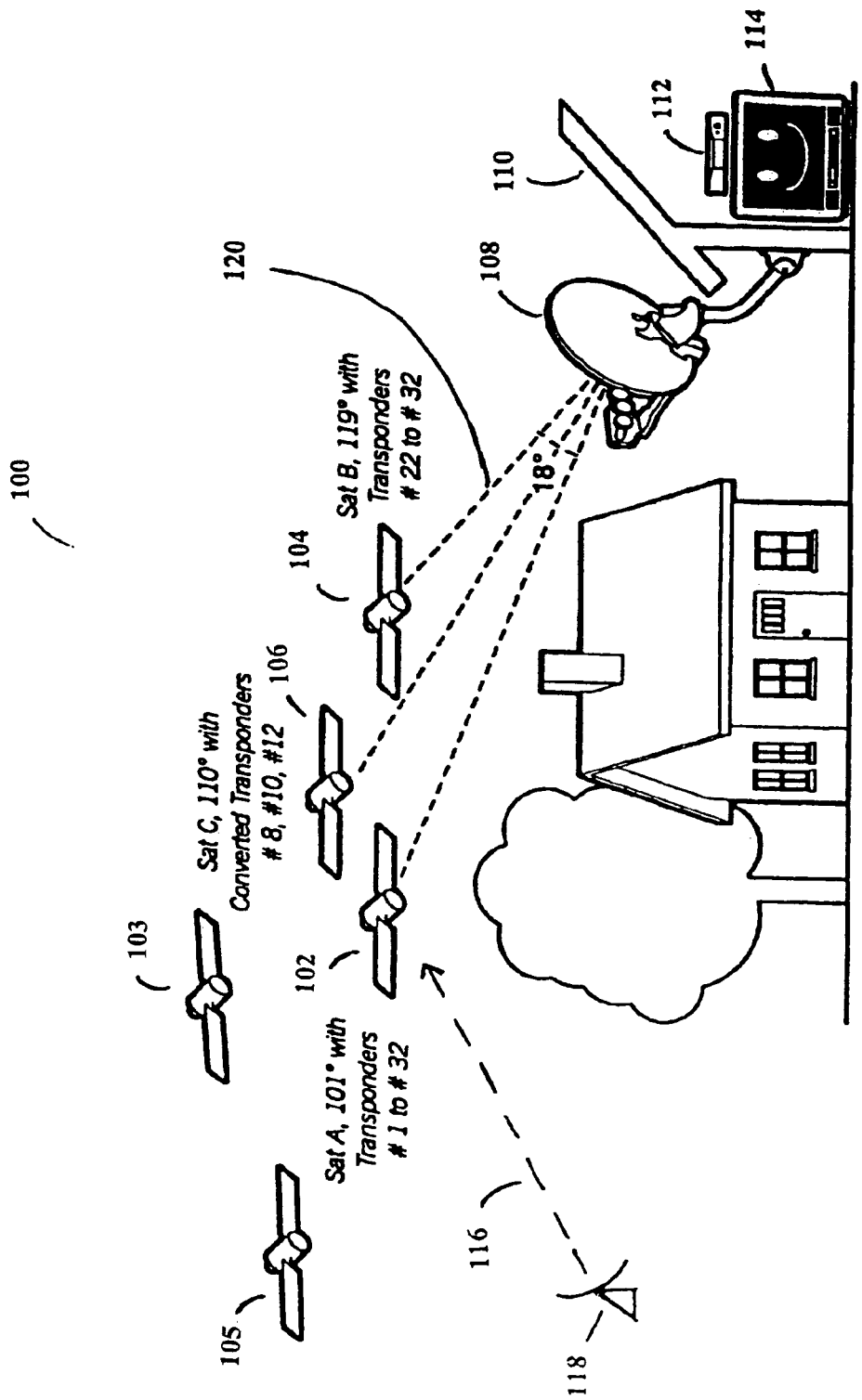
FIG. 1 illustrates a satellite constellation of the present invention.

FIG. 1 illustrates a satellite constellation of the present invention.

System 100 uses signals sent from Satellite A (SatA) 102, Satellite B (SatB) 104, and Satellite C (SatC) 106 (with transponders 28, 30, and 32 converted to transponders 8, 10, and 12, respectively), that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

The orbital locations of satellites 102-106 are fixed by regulation, so, for example, there is a satellite at 101 degrees West Longitude (WL), SatA 102; another satellite at 110 degrees WL, SatC 106; and another satellite at 119 degrees WL, SatB 104. Satellite 103 is located at 102.8 degrees WL, and satellite 105 is located at 9902 degrees WL. Other satellites may be at other orbital slots, e.g., 72.5 degrees, 95 degrees, and other orbital slots, without departing from the scope of the present invention. The satellites are typically referred to by their orbital location, e.g., SatA 102, the satellite at 101 WL, is typically referred to as "101."

Satellites 102, 104, and 106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Satellites 103 and 105 typically broadcast in the Ka-band of frequencies, i.e., 18-40 GHz, but typically 20-30 GHz.

Figure 2:
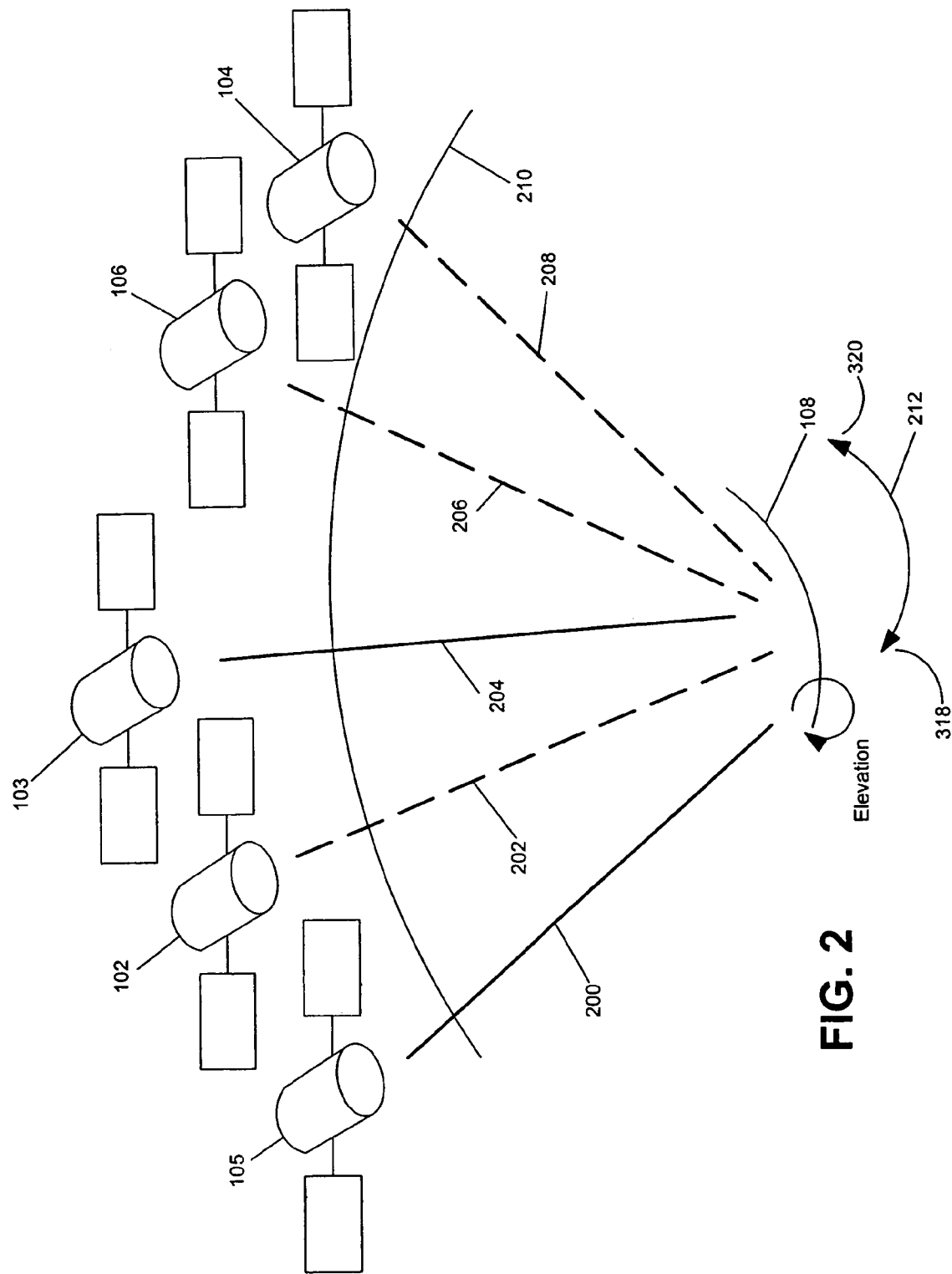
FIG. 2 illustrates an alignment in accordance with the present invention.

FIG. 2 illustrates an alignment in accordance with the present invention.

ODU 108 must receive signals 200-208, collectively referred to as downlink signals 120, on the reflector dish that is part of ODU 108. The reflector dish reflects downlink signals to feedhorns for reception and on to other electronics for processing.

Signals 200 and 204, which are transmitted by satellites 105 and 103 respectively, are transmitted in the Ka-band of frequencies, typically at frequencies of 18.3-18.8 GHz and 19.7-20.2 GHz. These transmissions are shown as solid lines for signals 200 and 204. Signals 202, 206, and 208 are transmitted in the Ku-band of frequencies, typically at the 12.2-12.7 GHz range.

Satellites 102-106 are located in geosynchronous orbital locations that are on an arc 210, also known as the "Clarke Belt." To properly align ODU 108 to satellites 102-106, if any two points on the arc 210 are aligned with respect to ODU 108, the remainder of the points will be aligned as well, and, as such, by aligning ODU 108 to two satellites 102-106, the remainder of satellites 102-106 will automatically align.

Typically, alignments are done with respect to the most sensitive feature of the alignment. In this case, the most sensitive alignment feature would be signals 200 and 204, because at their higher frequency of transmission, the losses and alignment errors for these signals 200 and 204 would be most affected by misalignment of ODU 108 with arc 210.

However, the present invention does not use signals 200 and 204 to align ODU 108; rather, the present invention uses two other signals to align ODU 108 with satellites 102-106.

Azimuth, Elevation, and Tilt (Skew or Rotation)

Figure 3:
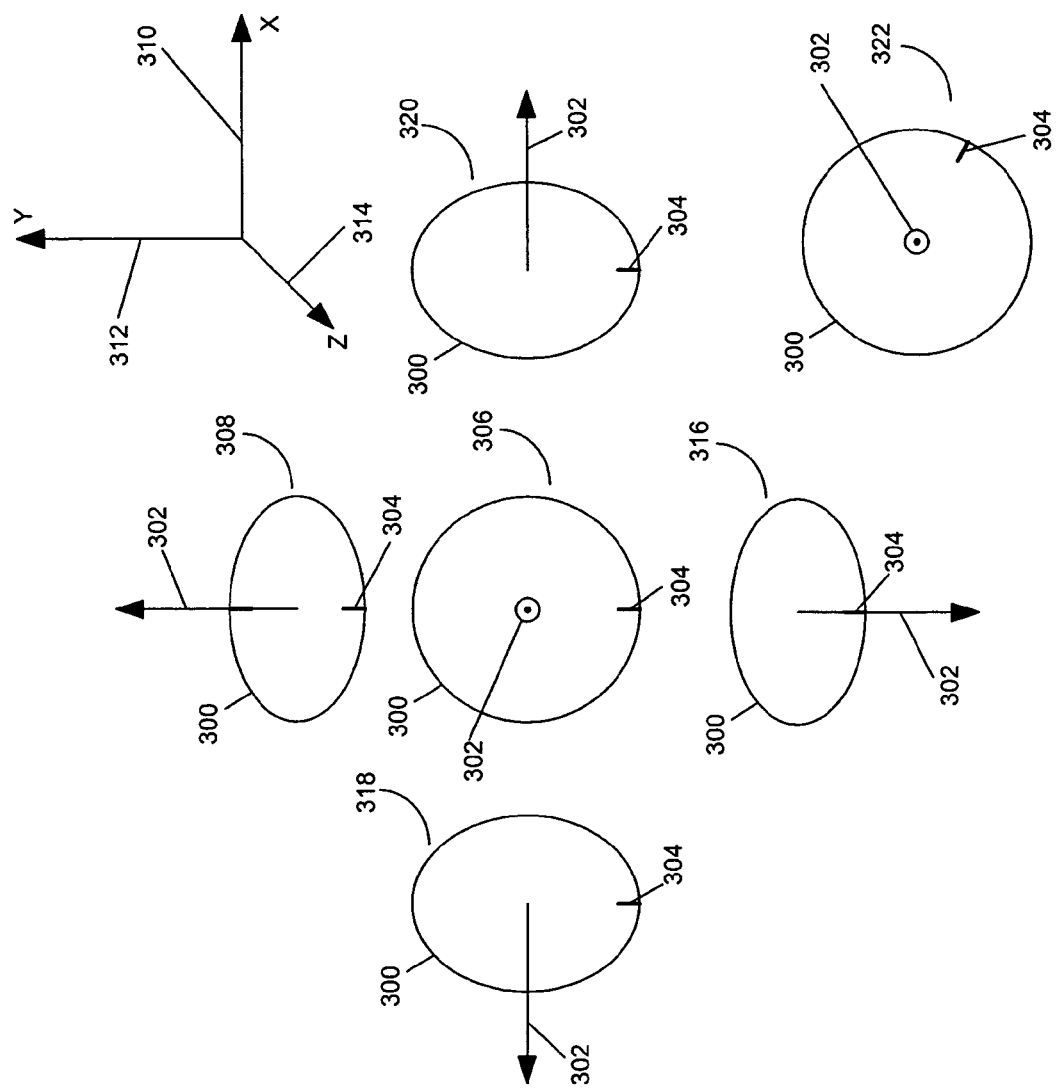
FIG. 3 illustrates azimuth, elevation, and rotational adjustments of an ODU with respect to the present invention.

FIG. 3 illustrates azimuth, elevation, and rotational adjustments of an ODU with respect to the present invention.

Antenna reflector 300 is shown, with boresight 302 and rotational mark 304 illustrated. Although boresight 302 is shown substantially at the center of antenna reflector 300, boresight 302 can be at other locations without departing from the scope of the present invention.

As shown in configuration 306, reflector 300 is pointed directly out of the page, with boresight 302 showing the end of the arrow in standard notation. The boresight 302 is pointed directly at the viewer.

In configuration 308, reflector 300 is rotated around the x-axis 310, and is held constant with respect to y-axis 312 and z-axis 314. As such, reflector is tilted "up," e.g., away from the plane of the page, and, as such, boresight 302 points up. This is considered an increase in the elevation of reflector 300.

In configuration 316, reflector 300 is rotated in the opposite direction around the x-axis 310 with regard to the direction of rotation in configuration 308, and is again held constant with respect to y-axis 312 and z-axis 314. As such, reflector is tilted "down," e.g., away from the plane of the page, and, as such, boresight 302 points down. This is considered a decrease in the elevation of reflector 300.

In configuration 318, reflector 300 is rotated around the y-axis 312, and is held constant with respect to x-axis 310 and z-axis 314. As such, reflector is tilted "left," e.g., away from the plane of the page, and, as such, boresight 302 points left. This is considered an increase in the azimuth of reflector 300.

In configuration 320, reflector 300 is rotated in the opposite direction around the y-axis 312 with regard to the direction of rotation in configuration 308, and is again held constant with respect to x-axis 310 and z-axis 314. As such, reflector is tilted "right," e.g., away from the plane of the page, and, as such, boresight 302 points right. This is considered a decrease in the azimuth of reflector 300.

In configuration 322, reflector 300 is rotated around the z-axis 314, and is held constant with respect to x-axis 310 and y-axis 312. As such, reflector is rotated "counterclockwise," e.g., in the plane of the page and to the right, and, as such, rotational mark is no longer at the bottom of reflector 300, but has moved to the right. This is considered an increase in the tilt (also called skew or rotation) of reflector 300.

To properly align reflector 300, and, as such, ODU 108 of which reflector 300 is a part, the reflector 300 must be pointed at the proper azimuth, elevation, and tilt to be able to receive signals from satellites 102-106.

Returning to FIG. 2, azimuth mark 212 shows the positive direction configuration 318 and negative direction configuration 320 of azimuth movement of ODU 108 (and reflector 300). As ODU 108 is moved along azimuth line 212 in a positive direction, the signals 200, 202, and 204 will be better received by ODU 108; similarly, when ODU 108 is moved along azimuth line 212 in a negative direction, signals 206 and 208 will be better received by ODU 108. As such, the present invention uses a method that maximizes the power received from all signals 200-204, with a bias toward signals 200 and 204.

For a given set of locations on the earth, aligning ODU 108 to the true peaks of Ku-band signals 202 and 208 will result in minimum azimuth, elevation, and tilt pointing errors, because signals 202 and 208 are approximately located at the two ends of the arc 210 that the ODU 108 needs to be aligned to. Once proper elevation is achieved, by proper mechanical feedhorn positioning, any additional satellites, as well as satellites 102-106, are automatically aligned in their optimal respective positions. Further, predictable errors can be anticipated for locations that have special needs, e.g., where the satellites 102-106 are viewed in a pattern different than the optimal arc 210.

The present invention uses signal 202, from satellite 102, as the main alignment point. Azimuth and elevation are set using signal 202, which is at the Ku-band, which minimizes topocentric variations across a large geographic area (e.g., the continental United States, or "CONUS,"), for signals 200 and 204. Signal 208 is used to ensure proper rotational alignment, i.e., tilt, of ODU 108. The use of signals 202 and 208 for alignment purposes provides proper alignment of ODU 108 in all three of the alignment directions, namely, azimuth, elevation, and tilt.

Signals 202 and 208, more specifically the Right-Hand Circularly Polarized (RHCP) Ku-band portion of signals 202 and 208, allow for a constant fixed correction, or a set of fixed corrections, to be applied to peak the reception of signals 200-208 around the peak of signal 202. Further, signals 202 and 208 have less signal variation compared to signals 200 and 204, because signals 202 and 208 are less affected by atmospheric scintillation and scattering of the higher frequencies present in signals 200 and 204.

As such, the present invention does not use signals 200 or 204 to align ODU 108 (and reflector 300) to signals 204. Instead, the present invention uses signal 202 to perform the azimuth and elevation alignments of ODU 108, and signal 208 to perform the tilt alignment of ODU 108. Such use of signal 202 and signal 208 can be performed in a recursive manner, e.g., find the best reception of signal 202 using azimuth and elevation adjustments to ODU 108, then find the best reception of signal 208 using tilt adjustments to ODU 108, then re-check the reception of signal 202 using azimuth and elevation adjustments to ODU 108, etc., until the ODU 108 is optimally aligned in azimuth, elevation, and tilt to signals 202 and 208.

It is also contemplated within the scope of the present invention that after maximizing the signal reception of signals 202 and 208, that ODU 108 can be offset from this position to maximize the reception of signals 200 and 204. Such an offset can be performed based on geoposition (i.e., where on the earth ODU 108 is located), where an offset in one geographical location is different than the offset in another geographical location. For example, and not by way of limitation, the offset in Portland, Me., may be different than the offset in San Diego, Calif., because of the latitude and/or longitude differences between those two cities. The offset may occur in one or more of the three alignment axes.

Further, since signals 200 and 204 are at Ka-band frequencies, it is now possible given the present invention to properly align Ka-band frequencies without ever reviewing the power strength of the Ka-band frequencies during alignment. As such, the present invention allows for alignment of satellites at one orbital slot while looking for signals from another orbital slot, as well as alignment of a frequency band while aligning to signals in a different frequency band.

Process Chart

Figure 4:
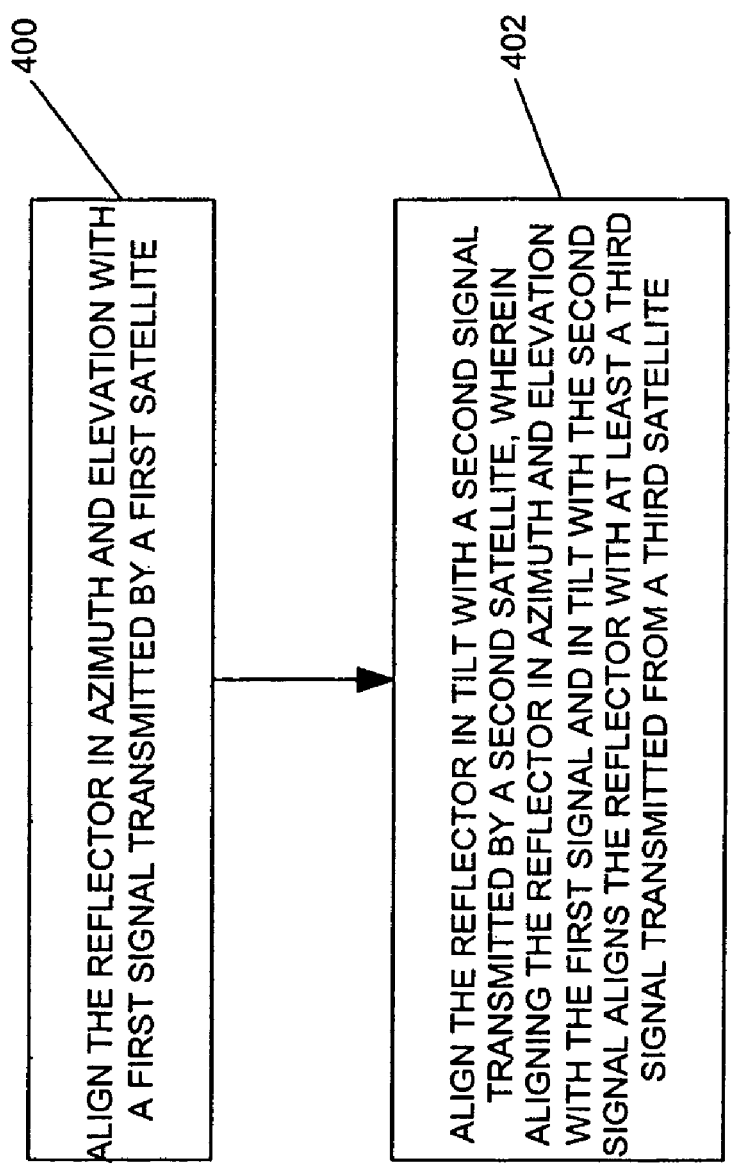
FIG. 4 illustrates a process chart in accordance with the present invention.

FIG. 4 illustrates a process chart in accordance with the present invention.

Box 400 illustrates aligning the reflector in azimuth and elevation with a first signal transmitted by a first satellite.

Box 402 illustrates aligning the reflector in tilt with a second signal transmitted by a second satellite, wherein aligning the reflector in azimuth and elevation with the first signal and in tilt with the second signal aligns the reflector with at least a third signal transmitted from a third satellite.

Conclusion

In summary, the present invention comprises a method, apparatus and system for aligning an antenna reflector with satellites in a satellite configuration. A method in accordance with the present invention comprises aligning the reflector in azimuth and elevation with a first signal transmitted by a first satellite in the satellite configuration, and aligning the reflector in tilt with a second signal transmitted by a second satellite in the satellite configuration, wherein aligning the reflector in azimuth and elevation with the first signal and in tilt with the second signal aligns the reflector with at least a third signal transmitted from a third satellite.

Such a method optionally further comprises the first satellite being at a first orbital slot and the second satellite is at a second orbital slot, the third satellite being at a third orbital slot, the first satellite and the second satellite transmitting in a first frequency band, the third satellite transmitting in a second frequency band, and re-aligning the reflector in azimuth and elevation with the first signal transmitted by the first satellite after aligning the reflector in tilt.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A method for aligning a reflector of an antenna with a satellite configuration, comprising:
   aligning the reflector in azimuth and elevation with a first signal transmitted by a first satellite in the satellite configuration;
   aligning the reflector in tilt with a second signal transmitted by a second satellite in the satellite configuration, wherein aligning the reflector in azimuth and elevation with the first signal and in tilt with the second signal aligns the reflector with at least a third signal transmitted from a third satellite.

2. The method of claim 1, wherein the first satellite is at a first orbital slot and the second satellite is at a second orbital slot.

3. The method of claim 2, wherein the third satellite is at a third orbital slot.

4. The method of claim 1, wherein the first satellite and the second satellite transmit in a first frequency band.

5. The method of claim 4, wherein the third satellite transmits in a second frequency band.

6. The method of claim 1, further comprising:
   re-aligning the reflector in azimuth and elevation with the first signal transmitted by the first satellite after aligning the reflector in tilt.

7. The method of claim 1, further comprising offsetting the reflector by a fixed amount after aligning the reflector.

8. The method of claim 7, wherein the fixed amount is dependent on geographical location of the reflector.

9. An alignment system, comprising:
   a plurality of satellites in geosynchronous orbit; and
   an antenna having a reflector, the reflector having a boresight and a rotational mark, the reflector being aligned in azimuth and elevation with a first signal transmitted by a first satellite in the plurality of satellites, and the reflector being aligned in tilt with a second signal transmitted by a second satellite in the plurality of satellites, wherein aligning the reflector in azimuth and elevation with the first signal and in tilt with the second signal aligns the reflector with at least a third signal transmitted from a third satellite in the plurality of satellites.

10. The alignment system of claim 9, wherein the first satellite in the plurality of satellites is at a first orbital slot and the second satellite in the plurality of satellites is at a second orbital slot.

11. The alignment system of claim 10, wherein the third satellite in the plurality of satellites is at a third orbital slot.

12. The alignment system of claim 9, wherein the first satellite in the plurality of satellites and the second satellite in the plurality of satellites transmit in a first frequency band.

13. The alignment system of claim 12, wherein the third satellite in the plurality of satellites transmits in a second frequency band.

14. The alignment system of claim 9, further comprising: re-aligning the reflector in azimuth and elevation with the first signal transmitted by the first satellite in the plurality of satellites after aligning the reflector in tilt.

15. The alignment system of claim 9, further comprising offsetting the reflector by a fixed amount after aligning the reflector.

16. The alignment system of claim 15, wherein the fixed amount is dependent on geographical location of the reflector.

17. The alignment system of claim 9, wherein alignment of the reflector is performed by aligning the boresight of the reflector.

18. The alignment system of claim 17, wherein the alignment of at least one of the azimuth, the elevation, and the tilt of the reflector is performed using a signal other than a most sensitive signal transmitted by the plurality of satellites.

19. An alignment system, comprising:
a satellite constellation; and
a terrestrial antenna, the terrestrial antenna being aligned in azimuth and elevation with a first satellite signal transmitted by a first satellite in the satellite constellation, and the terrestrial antenna being aligned in tilt with a second signal transmitted by a second satellite in the satellite constellation, wherein aligning the terrestrial antenna in azimuth and elevation with the first signal and in tilt with the second signal aligns the terrestrial antenna with at least a third signal transmitted from a third satellite in the satellite configuration.

20. The alignment system of claim 19, further comprising offsetting the terrestrial antenna by a fixed amount after aligning the terrestrial antenna.

* * * * *